United States Patent
Richard

(10) Patent No.: US 7,124,435 B1
(45) Date of Patent: Oct. 17, 2006

(54) INFORMATION MANAGEMENT SYSTEM AND METHOD

(75) Inventor: Philippe Richard, Coarsegold, CA (US)

(73) Assignee: Avanza Technologies, Inc., Whittier, CA (US)

(*) Notice: Subject to any disclaimer, the term of this patent is extended or adjusted under 35 U.S.C. 154(b) by 956 days.

(21) Appl. No.: 10/040,933

(22) Filed: Oct. 23, 2001

Related U.S. Application Data

(60) Provisional application No. 60/246,821, filed on Nov. 7, 2000.

(51) Int. Cl.
  *G07F 17/22* (2006.01)
  *G07F 17/30* (2006.01)
  *G07F 17/40* (2006.01)
(52) U.S. Cl. .................................... 726/6; 713/167
(58) Field of Classification Search .................. None
  See application file for complete search history.

(56) References Cited

U.S. PATENT DOCUMENTS 5,586,260 A * 12/1996 Hu ............................. 726/12
6,195,366 B1 * 2/2001 Kayashima et al. ........ 370/475

* cited by examiner

*Primary Examiner*—Gilberto Barrón, Jr.
*Assistant Examiner*—Venkat Perungavoor
(74) *Attorney, Agent, or Firm*—Roberts, Mardula & Wertheim, LLC

(57) ABSTRACT

An information management method includes invoking a client environment hosted on a client machine. The client environment is registered with a discovery machine coupled to the client machine by a network. A server machine coupled to the network registers with the discovery machine. A host environment of the client environment on the server machine registers with the discovery machine upon an indication that the server machine has a communication for the client environment. A direct link is established between the client machine and the server machine and the communication is delivered from the server machine to the client machine.

8 Claims, 13 Drawing Sheets

FIG. 12 "CLIENT AND SERVER ARCHITECTURE"

INFORMATION MANAGEMENT SYSTEM AND METHOD

CROSS REFERENCE TO RELATED APPLICATIONS

This application claims priority from provisional application U.S. Ser. No. 60/246,821, filed on Nov. 7, 2000, entitled "METHOD AND SYSTEM FOR PASSING BUSINESS OBJECTS", incorporated herein by reference.

BACKGROUND OF THE INVENTION

The present invention relates to information management systems and more particularly to complex information management systems over a network.

Methods to control and track information via the Internet have long been a subject of great interest and controversy to consumers, corporations and government. At the consumer level, spam (unsolicited email), keeping personal information (social security numbers, credit card numbers, etc) from hackers and controlling who has their information are all important issues. Corporations are interested in preventing the spread of viruses that can adversely damage costly computer systems, having access to consumer information which can help promote their ability to market/sell products and optimizing sales/supplier networks. Government also has an interest in preventing viruses. It also has a role in protecting consumers yet balancing the needs of corporations to grow which can directly impact the economy.

Another issue that also garners attention is the replication of information on the Internet. For example, it is likely that any user of the Internet has multiple login ID's and passwords for the various websites they frequent. On these websites, the same information is typically repeated, such as name, address and telephone numbers. If a piece of information needs to be updated such as a telephone number, it needs to be updated at each site. Similarly the use of "mirror" sites or copies of existing websites in different geographic areas on different servers are often used to decrease the load on any one specific server and provides backup if one server goes down. This practice however is costly due to the increased number of servers.

Passport® by the Microsoft Corporation of Redmond, Wash. provides a single login service for multiple websites. Instead of having to memorize and keep track of unique login names and passwords for each website requiring a login, users utilizing websites that employ Passport® only need to keep track of one login name and password. While this may possibly solve the problem of multiple login names, passwords and replication of personal information, it has been slow to be accepted by large numbers of websites. Also, in exchange for using Passport®, a user potentially surrenders his or her personal information to all website operators that utilize Passport®. Additionally, a Passport® user can potentially be subject to spam since the user's email address is now located in the Passport® database that can possibly be accessible by various third parties.

HailStorm, also by the Microsoft Corporation of Redmond, Wash. provides the same functions as Passport® but can also deliver distributed services. For example, if a user utilizes a travel website, HailStorm can potentially secure airline tickets, car reservation, hotel reservations and theater tickets all based on one set of criteria through multiple providers of each unique service. What is lacking, though, is that now a person's information is being passed on to an even larger pool and the user still lacks control of who that information is subsequently transmitted to.

In the area of email, digital signatures have started to become popular as a means to verify the integrity of an email address. Digital signatures do not tell a person who owns the address, however.

Digital certificates are often employed to verify identification of a person, for example—establishing the right of a user to use a piece of software. While this mechanism provides a positive identification mechanism, it is only a one-way communication. This aspect disadvantageously does not foster two-way communication.

Encryption techniques, such as public/private key infrastructure (PKI), allow for the secure transfer of information that is inaccessible when it is encrypted, except by the person who sent it and the person who receives it. While a step in the right direction of controlling unauthorized access to information, the recipient is free to disseminate the information at will and the sender has no control.

Similar to PKI is PGP (Pretty Good Privacy). PGP verifies the identification of a sender of information only. PGP also has the same drawbacks as PKI since control of how information is propagated is lost once it has been transmitted.

Accordingly, what is needed is a method to manage the flow of information that allows individual users and entities to control who has their information, who it can be sent to and the ability to recall that information if the need arises. Also what is needed is a way to update information once and have it propagated to all valid holders of that data.

SUMMARY OF THE INVENTION

The present invention provides a system and method that allows users and entities to have total control over their information. Only specified users can have access to information as dictated by the owner. They can only propagate that information with the owner's permission. Also, any updates are automatically propagated to all recipients of a particular piece of information.

An information management method in accordance with the present invention includes invoking a client environment hosted on a client machine. The client environment is registered with a discovery machine coupled to the client machine by a network. A server machine coupled to the network registers with the discovery machine. A host environment of the client environment on the server machine registers with the discovery machine upon an indication that the server machine has a communication for the client environment. A direct link is established between the client machine and the server machine and the communication is delivered from the server machine to the client machine.

An information management system in accordance with the present invention includes a plurality of client machines, each of which are coupled to a network, that host a plurality of client environments. A plurality of server machines, each of which are coupled to the network, also host a plurality of host client environments. A plurality of discovery machines, each of which are coupled to the network, facilitates a connection between a single client environment and a single host client environment for the transfer of information.

An advantage of the present invention is that all data is double encrypted to prevent unauthorized access of information. Also, the discovery machines do not have access either. Additionally, the identity of all the users are verified, unwanted solicitations (spam) is eliminated and viruses are eliminated.

These and other advantages of the present invention will become apparent to those skilled in the art upon a reading of the following descriptions and a study of the various figures of the drawing.

DETAILED DESCRIPTION OF THE PREFERRED EMBODIMENT(S)

Figure 1:
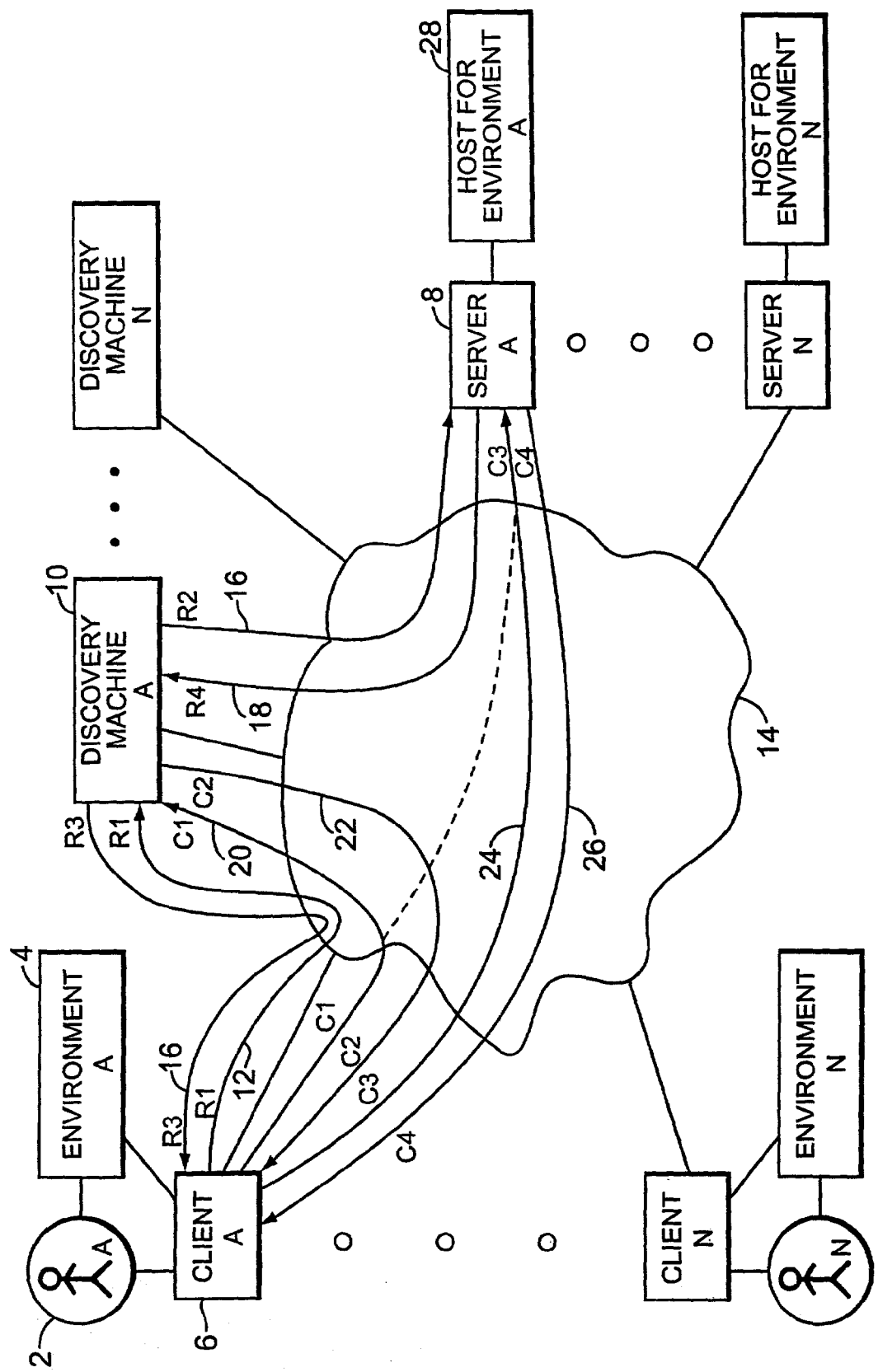
FIG. 1 illustrates the registration and connection process in accordance with the present invention.

FIG. 1 illustrates the registration and connection process in accordance with the present invention. FIG. 1 shows a general setup of a plurality of client machines, each of which can host a user and an environment (client A through client N where "N" signifies up to "N" number of clients). Similarly there are a plurality of server machines, each of which can host an environment (server machine A to server machine N) and discovery machines (discovery machine through discovery machine N). It should be noted that in the context of the present invention that a personal computer (PC) can take on the role of a client or server or even both client and server.

In this example, client A, also referred to as client machine 6, can communicate with server A, also referred to as server machine 8, and a discovery machine A, also referred to as discovery machine 10, via network 14, which can be the Internet. For example, a user logs into a client machine 6 and needs to exchange information with a server machine 8 (or the server has information for the user/client). The discovery machine 10 serves as the traffic manager. By connecting a client machine 6 to a discovery machine 10, and a server machine 8 to a discover machine 10, the discovery machine 10 facilitates the establishment of a direct connection between the client machine 6 and the server machine 8. All communications between the various machines take place over the network 14.

The simplest example of the registration/connection process is between a single set of discovery, client and server machines and will now be described. User 2 operates in an environment 4, hosted on client machine 6. Both user 2 and environment 4 register (through client machine 6) with discovery machine 10, using registration connection R1 12 via network 14. Discovery machine 10 then registers server 8 using registration connection R2 16, also via network 14. The registration process is completed by discovery machine 10 by sending out registration connection R3 16 to client 6 and server 8 sends out registration connection R4 18 to discovery machine 10, again via network 14.

Server machine 8 needs to exchange information with client machine 6. Client machine 6 connects with discovery machine 10 via connection C1 20 to get the necessary location/connection information for server machine 8. Discovery machine 10 responds back with connection C2 22 with the necessary information. At this point client machine 6 directly communicates back and forth with server machine 8 via connections C3 24 and C4 26. Server machine 8 provides a host for environment 28. Connections C1 20, C2 22, C3 24 and C4 26 are all made via network 14.

Figure 2:
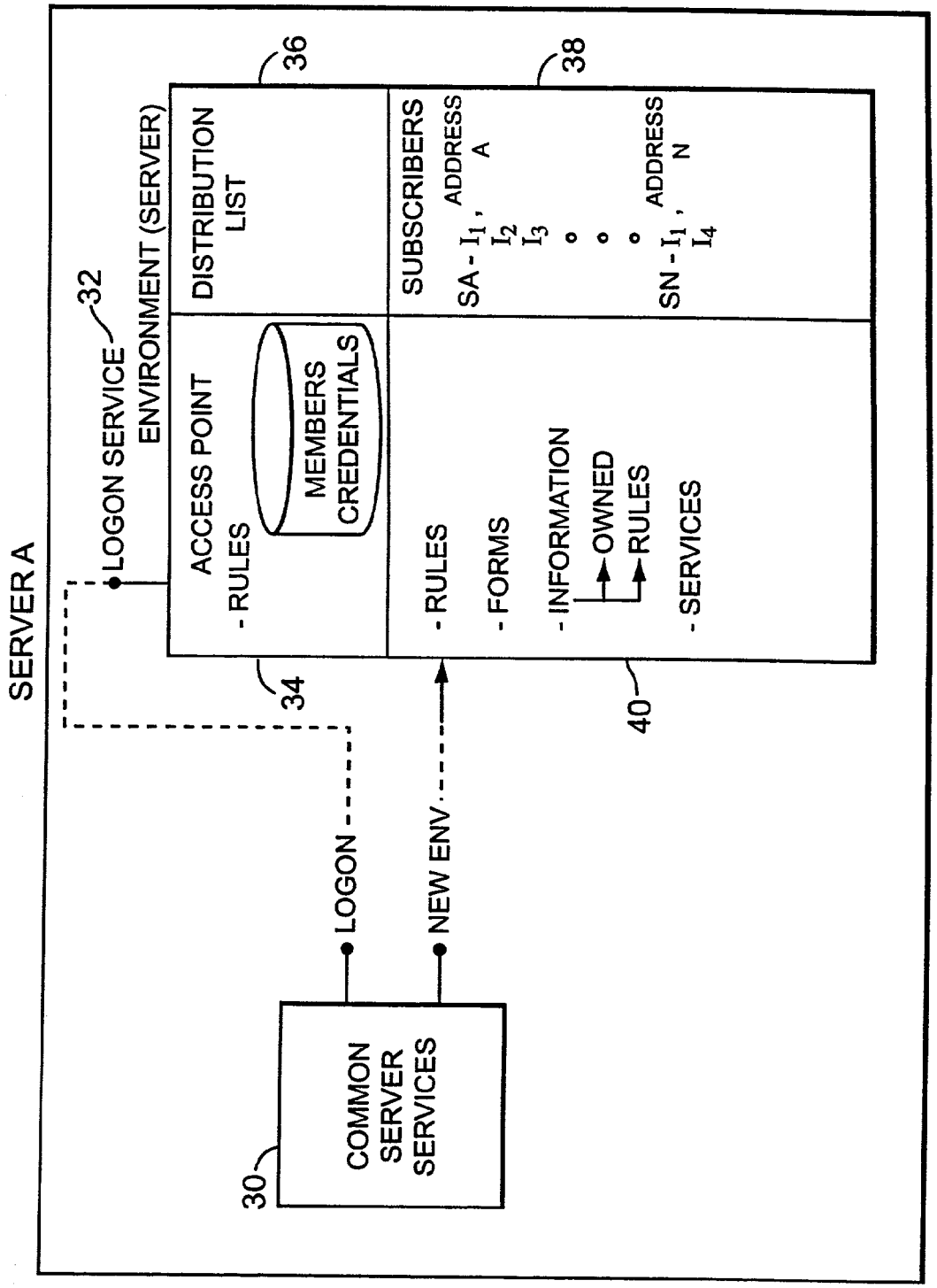
FIG. 2 illustrates the architecture of an environment hosted on a server machine in accordance with the present invention.

FIG. 2 illustrates the architecture of an environment hosted on a server machine in accordance with the present invention, specifically the architecture of the host for environment 28. An environment is a collection of objects (pieces of information) that it is able to serve. It also contains rules and credentials that determine ownership as to who may access the information. Located in the common server services 30 is the gateway to the logon service 32 that allows a user access to information if the access point rules/members credentials 34 are satisfied. This can be accomplished via a digital signature. The distribution list 36 contains the list of subscribers, who owns pieces of information and who to send updates to. The subscribers list 38 contains a list of subscribers, the information they own and the address of the information. Every time a new environment is formed, it can be customized via block 40. Rules determines how information is dealt with and who has access to it. Forms define the look of the interface that a user can customize to access information. Services define the means of accessing information in the environment.

Figure 3:
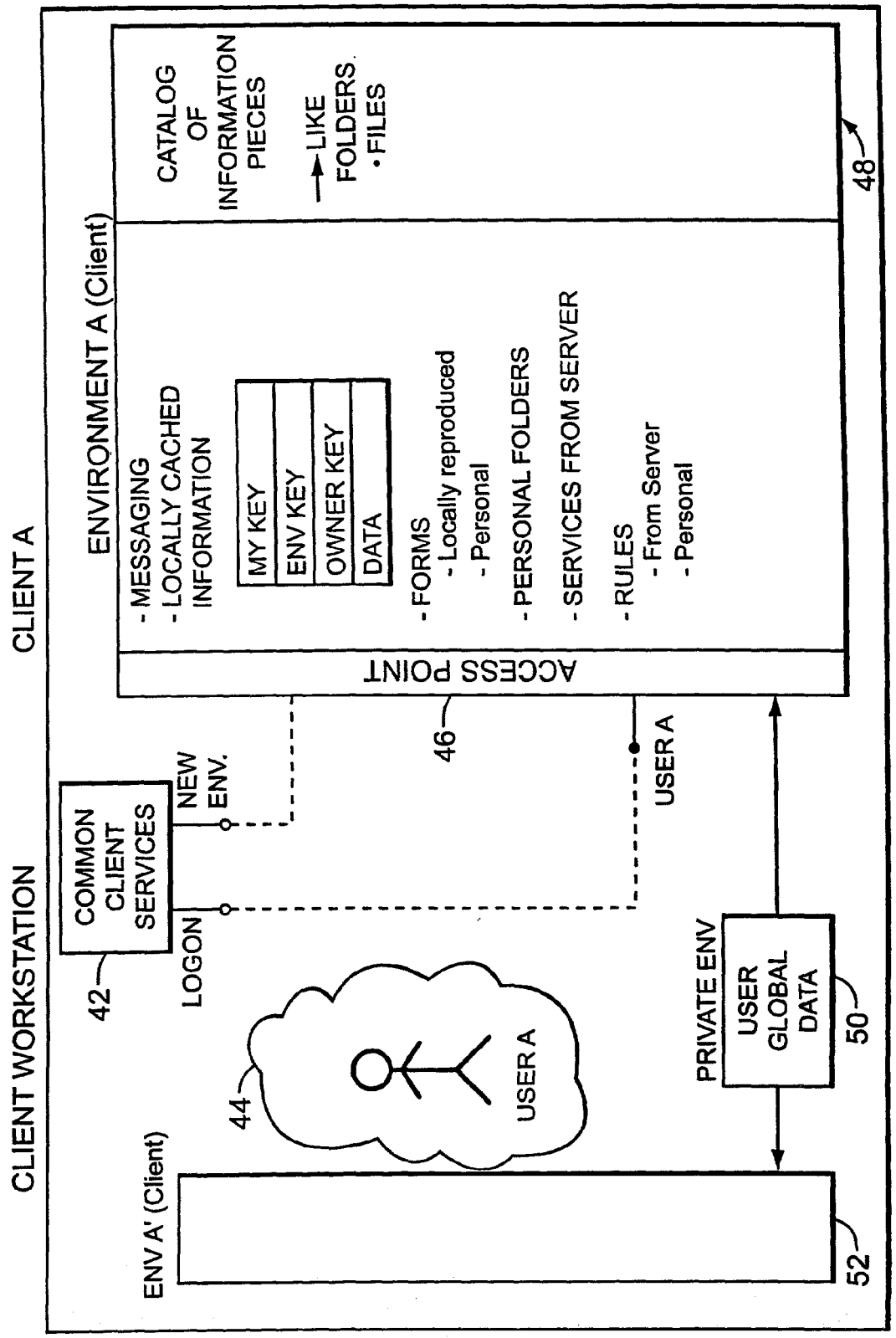
FIG. 3 illustrates the architecture of an environment hosted on a client machine in accordance with the present invention.

FIG. 3 illustrates the architecture of an environment hosted on a client machine in accordance with the present invention, specifically the environment 4 hosted on client 6. Similar to the host environment architecture, there is a common client services 42 that provides a means for logon and creating a new environment by the user 44 at access point 46. Contained in the environment is messaging capabilities to communicate with other users, locally cached information that replicates data to a local desktop, forms that a user 44 can use to customize the look of the interface, personal folders for storing information, services from the server and rules that define how the user 44 allows access by others to his information. The catalog 48 contains a list of information that is available to the user. The user global data 50 provides the connection between the environment and a host client machine 52.

Figure 4:
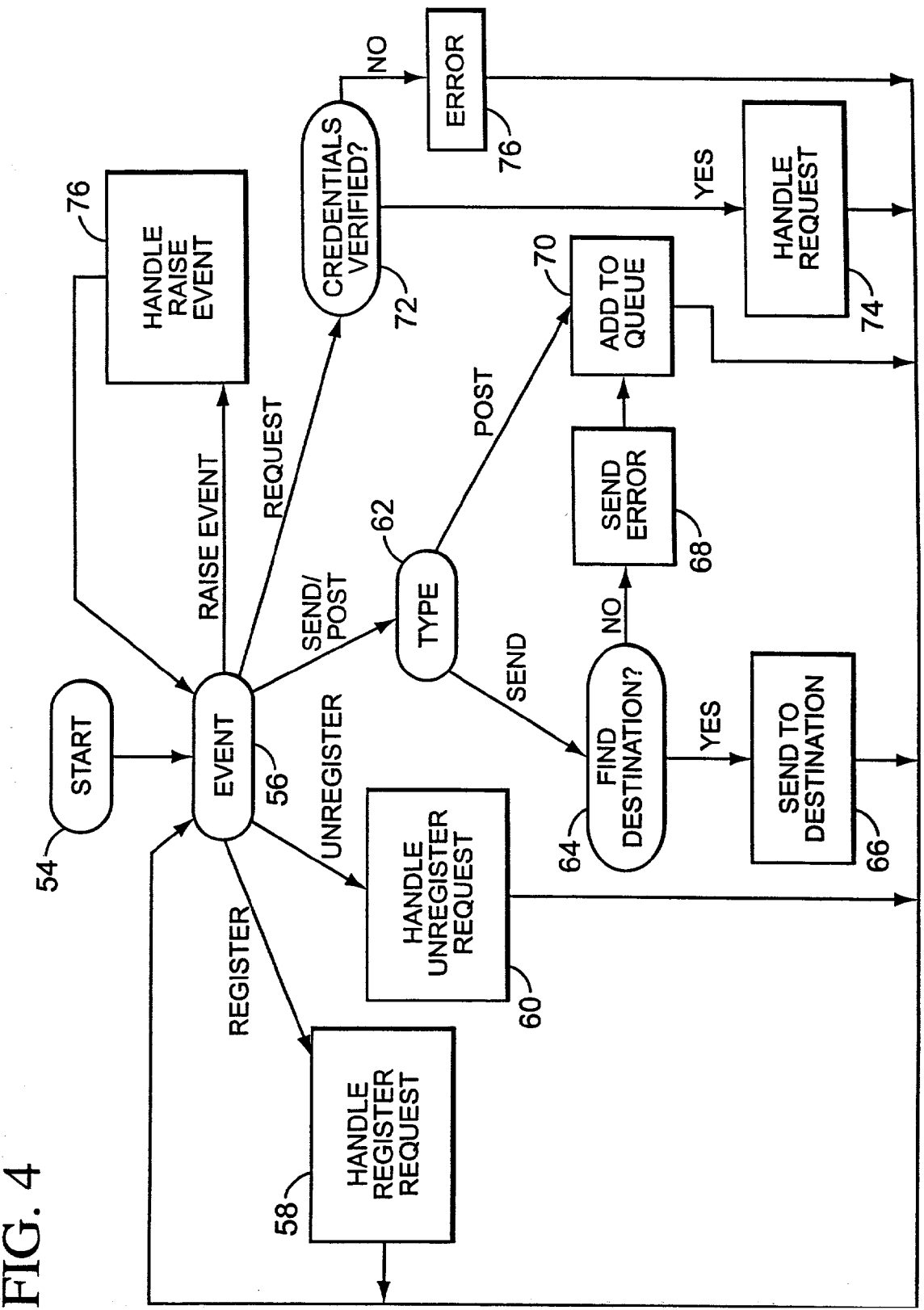
FIG. 4 is a flow diagram of an event handling process in a discovery machine of the present invention.

FIG. 4 is a flow diagram of an event handling process in a discovery machine of the present invention. As previously stated, a discovery machine plays the role of a traffic manager. It determines who is online and helps route information to the appropriate individual. If a person is not online/unreachable, it queues the information for later delivery once that person is available. Beginning at START 54, a discovery machine receives an event to handle at operation 56. A register request 58 signifies that a person has come online. The discovery machine processes this event and control returns back to operation 56. An unregister request signals that a person is going offline and that event is handled at operation 60 and control returns to operation 56.

A send/post event indicates that information needs to be exchanged. The type of information is determined to be a send or post at operation 62. A send type indicates that a person is online and the information can be sent to them right away. In this case, the destination for the information is determined at operation 64. If the destination is found, the information is delivered at operation 66 and control is returned to operation 56. If not, an error is generated at operation 68 and the information is deemed to be a post type. A post type indicates that a person is offline and therefore the information can not be delivered and it is put into a queue until it can be delivered. After operation 68, the undeliverable information is added to a queue at operation 70. Control then reverts back to operation 56. Referring back to type operation 62, if the type was determined to be of the post variety, the information is added to the queue 70 and once again control goes back to operation 56.

A request type event defines the situation where a person requests to see if there is any send/post information for them to receive. The person's credentials are verified at operation 72. If they have the proper credentials, the request is handled at operation 74 and then control is returned to operation 56. If they do not have the proper credentials, an error is generated at operation 76 and the request is denied. Control is once again returned to operation 56.

The last type of event for the discovery machine to process is the raise event type, handled at operation 76. Raise event takes care of cleanup items such as timeouts. After a raise event type is processed at operation 76, control also returns to operation 56.

Figure 5:
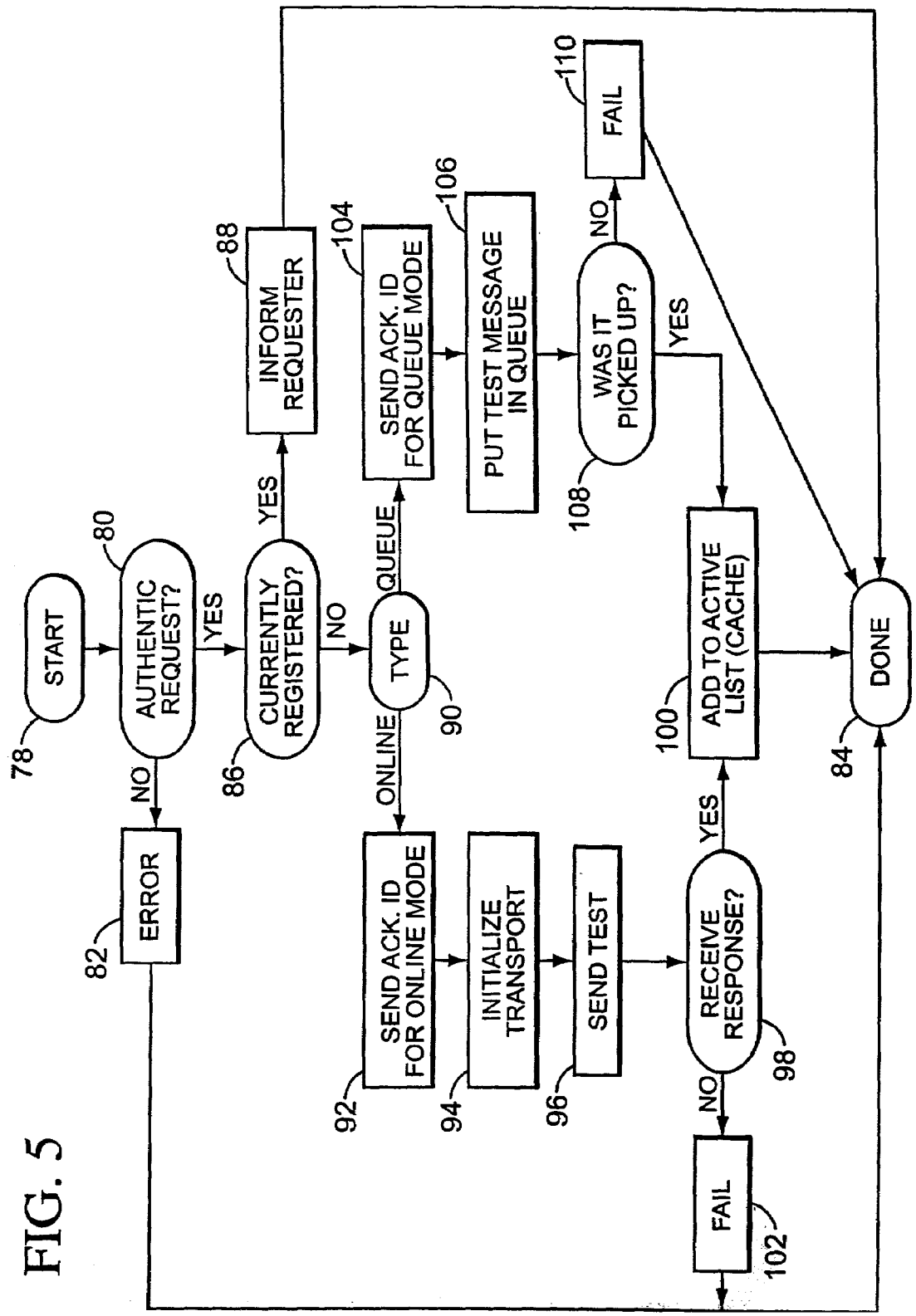
FIG. 5 is a flow diagram of a request authentication process in a host for an environment of the present invention.

FIG. 5 is a flow diagram of a request authentication process in a host for an environment of the present invention and more specifically, the functioning of the handle register request operation 58 of FIG. 4. Beginning at START 78, control proceeds to the request authentication operation 80. If the request is not a valid request (for example, the person sending the information does not have permission to send it), an error is generated at operation 82 and control is passed to DONE 84. If the request is authentic, it is determined if the person is online/registered at operation 86. If yes, the requester is informed at operation 88 and operational control is passed to operation 84. If the person is not currently online/registered, the proper type of delivery is determined at operation 90. If the person is online and accepting messages/information, an acknowledgement for online mode is sent at operation 92. The transport is initialized at operation 94 and a test message is sent at operation 96. If an acknowledgement is received at operation 98, the information is added to the recipient's cache at operation 100. Operational control is then passed to operation 84. If no acknowledgement of the test message is received, the request fails at operation 102 and control returns to operation 84.

Referring back to type operation 90, if the person is online but not accepting messages, the information is queued and an acknowledgement identification request is sent for queue mode at operation 104. A test message is then put in the queue to detect when the recipient is online at operation 106. Operation 108 determines if the information has been picked up by the recipient. If yes, it is added to the active cache of the user at operation 100. If not, a failure occurs at operation 110. Control passes to operation 84 after operations 108 and 110 are completed.

Figure 6:
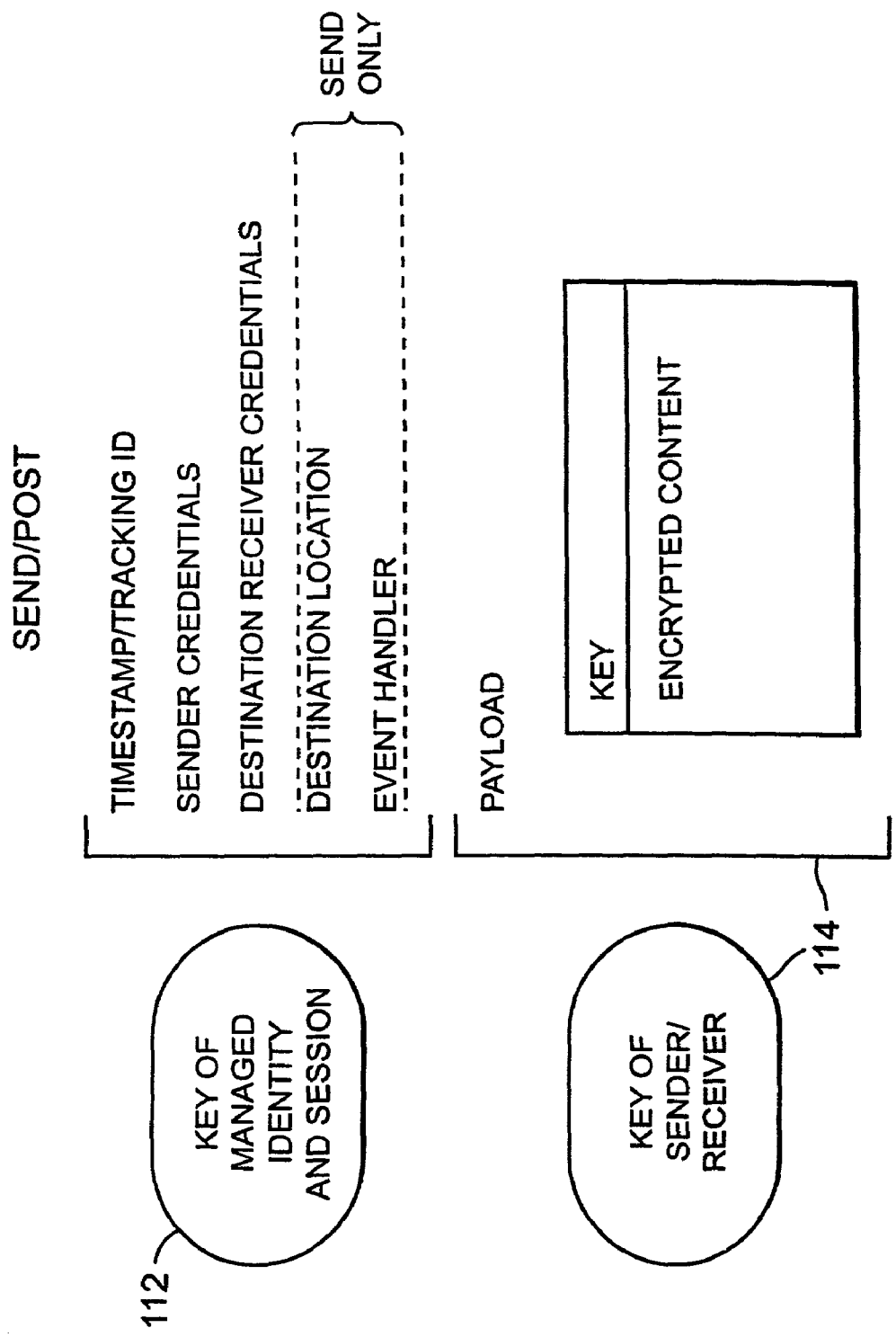
FIG. 6 illustrates the architecture of the send/post function in accordance with the present invention.

FIG. 6 illustrates the architecture of the send/post function in accordance with the present invention, and more particularly, the send/post type determination operation 62 of FIG. 4. Every message includes the encryption key of the managed identity and the session 112. Also contained in the architecture is a timestamp/tracking identification in case the information gets lost, a sender's credentials and destination information that includes the receiver's credentials. Additionally for a send type, the destination location and an event handler is included. The payload 114 contains the data being sent and encryption keys.

Figure 7:
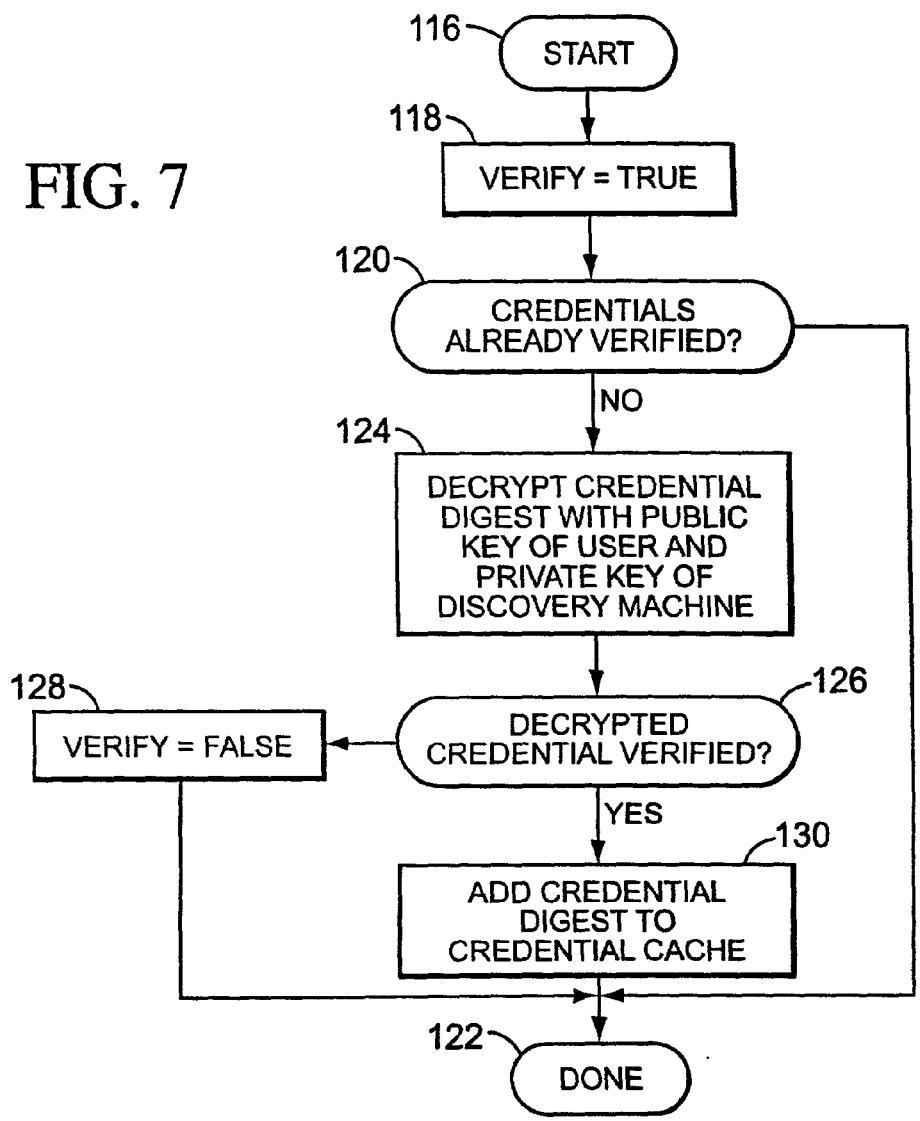
FIG. 7 is a flow diagram of a credential verification process of the present invention.

FIG. 7 is a flow diagram of a credential verification process of the present invention, and more specifically the credential verification operation 72 of FIG. 4. Beginning at START 116, control is passed to operation 118 where it is confirmed that a user needs to be verified. At operation 120, it is determined if the credentials have already been verified, if yes, operation is passed to DONE 122. If they have not, operation 124 decrypts the credential digest with the public key of the user and private key of the discovery machine. Operation 126 verifies if the credential got decrypted. If it did not, the user is not verified via operation 128. If the credential was decrypted, the credential digest is added to the credential cache at operation 130. Control passes to DONE 122 after operations 128 and 130.

Figure 8:
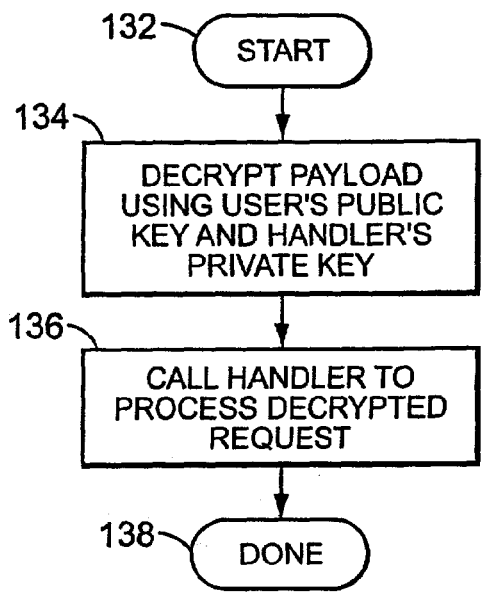
FIG. 8 is a flow diagram of a request handling process of the present invention.

FIG. 8 is a flow diagram of a request handling process of the present invention, and more particularly, the handle request operation 74 of FIG. 4. Beginning with START 132, control is passed to operation 134 where a payload is decrypted by using a user's public key and a handler's private key. At operation 136, the handler is called to process the decrypted request. The request handling process then terminates at DONE 138.

Figure 9:
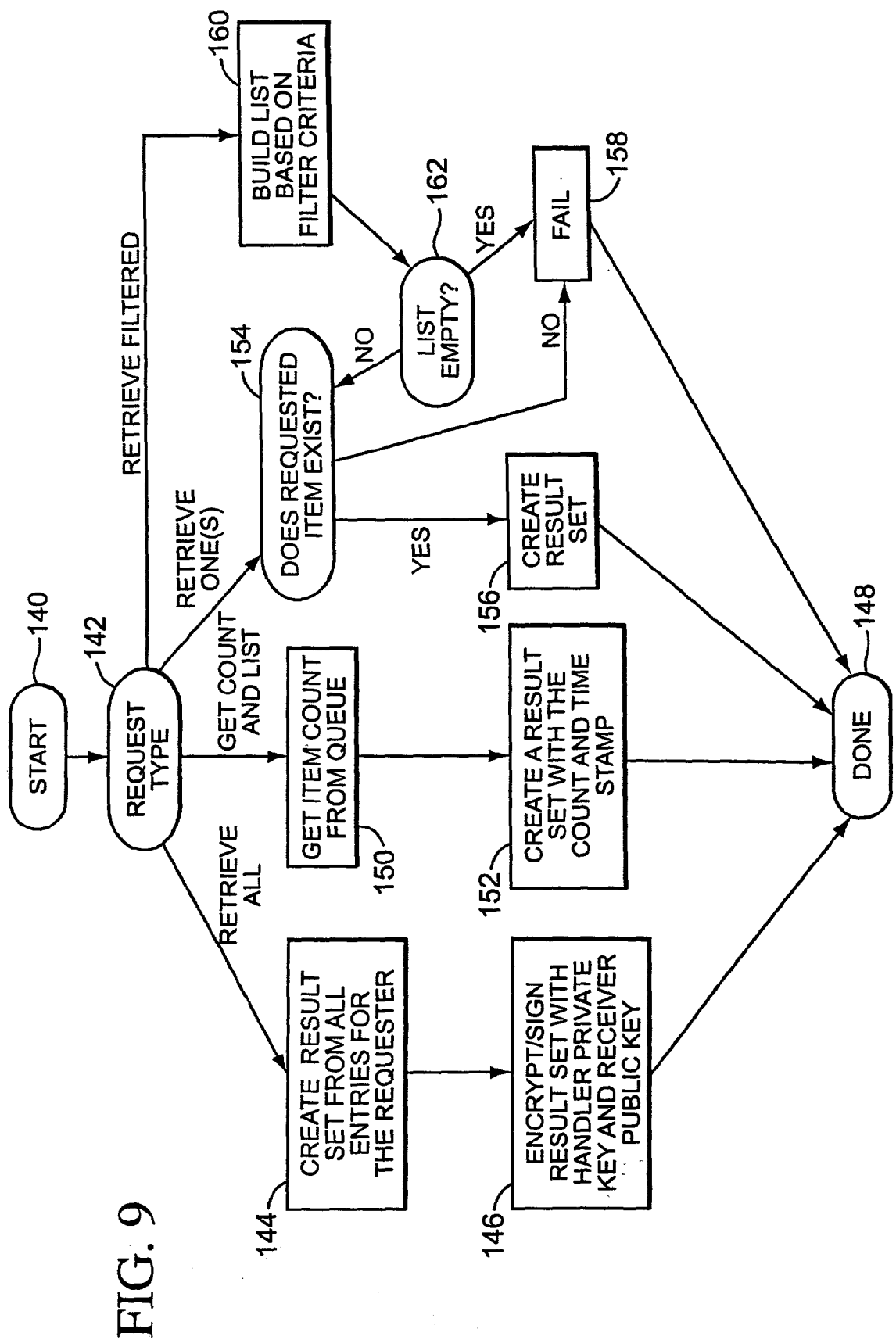
FIG. 9 is a flow diagram of a process to handle a decrypted request of the present invention.

FIG. 9 is a flow diagram of a process to handle a decrypted request of the present invention, and more specifically operation 136 of FIG. 8. Beginning at START 140, control passes to the request type operation 142. If all items need to be retrieved, operation 144 is executed where a result set is created from all entries for the requester. The result set is then encrypted/signed with the handler's private key and the receiver's public key at operation 146. The process then terminates at DONE 148. If the request type is to get a count and list, operation 150 is invoked after operation 142 and an item count is obtained from the queue. A result set is created with the count and a timestamp at operation 152 and the process ends at DONE 150. The retrieve one(s) request is performed at operation 154 where it is determined if the requested item exists. If it does, a result set is created at operation 156 and control is then passed to DONE 148. If not, a failure is generated at operation 158 and control is also then passed to DONE 148. The retrieved filtered event is performed at operation 160 where a list is built based on the filter criteria. The list is then checked to see if it is empty at operation 162. If it is not, the event is then treated as retrieve one(s) event and processed at operation 154 as previously described. If the list is empty, a failure is generated at operation 158 and the process then terminates at operation 148.

Figure 10:
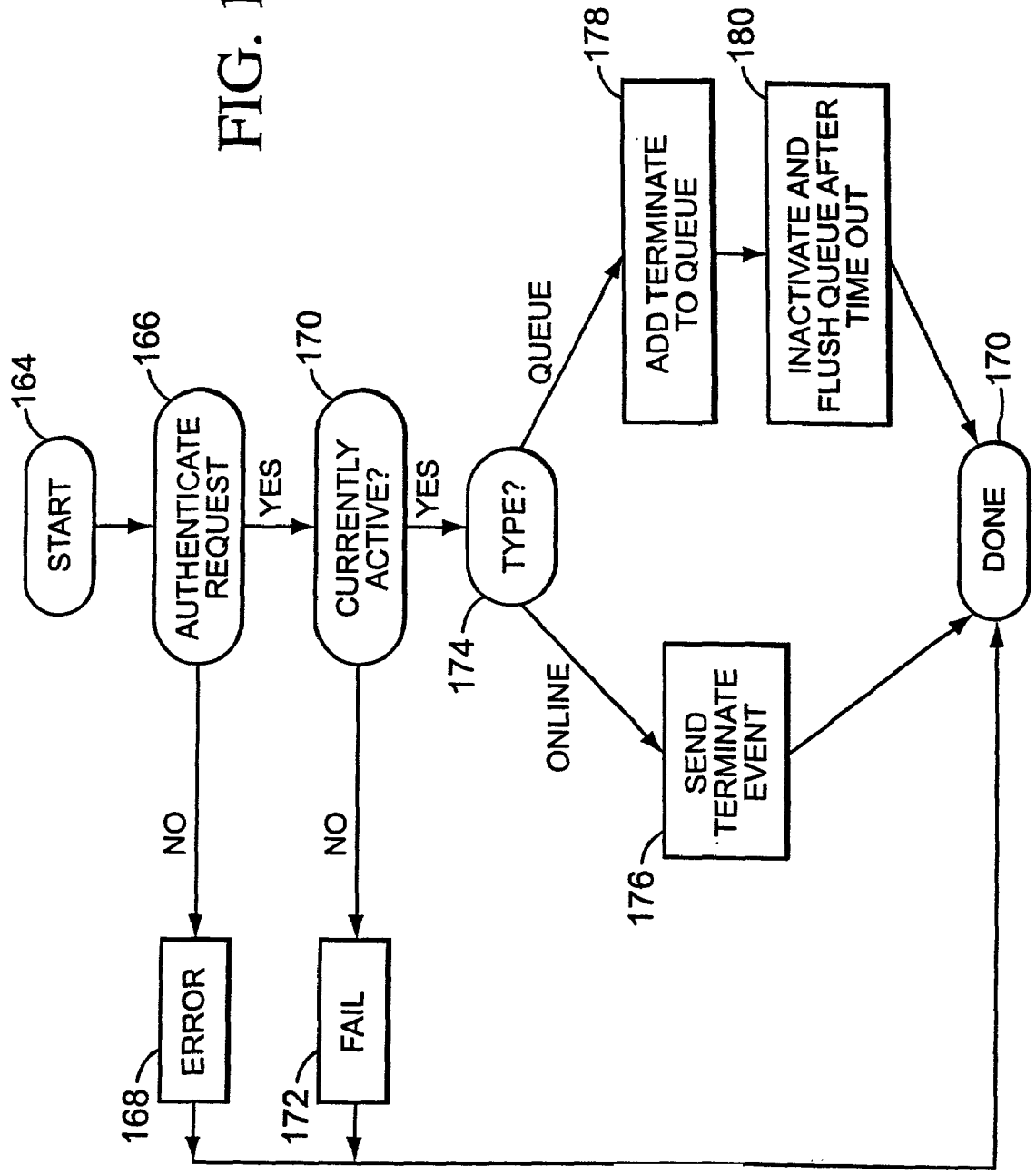
FIG. 10 is a flow diagram of a process to handle an unregister request of the present invention.

FIG. 10 is a flow diagram of a process to handle an unregister request of the present invention, and more particularly the handle unregister request operation 60 of FIG. 4. The process begins at START 164 and proceeds to operation 166 where it is determined if the request is authentic. If it is not, an error is generated at operation 168 and the process terminates at DONE 170. If the request is authentic, operation 170 determines if the request is still active. If it isn't, a failure is generated at operation 172 and the process ends at operation 170. The type of request is determined at operation 174 if the request is still active. If the person is online, a terminate event is sent at operation 176 and control is then passed to operation 170. Alternatively, the request can be queued if the person is not online via operation 178. The queue is inactivated and flushed after a time period via operation 180 and the process then ends at DONE 170.

Figure 11:
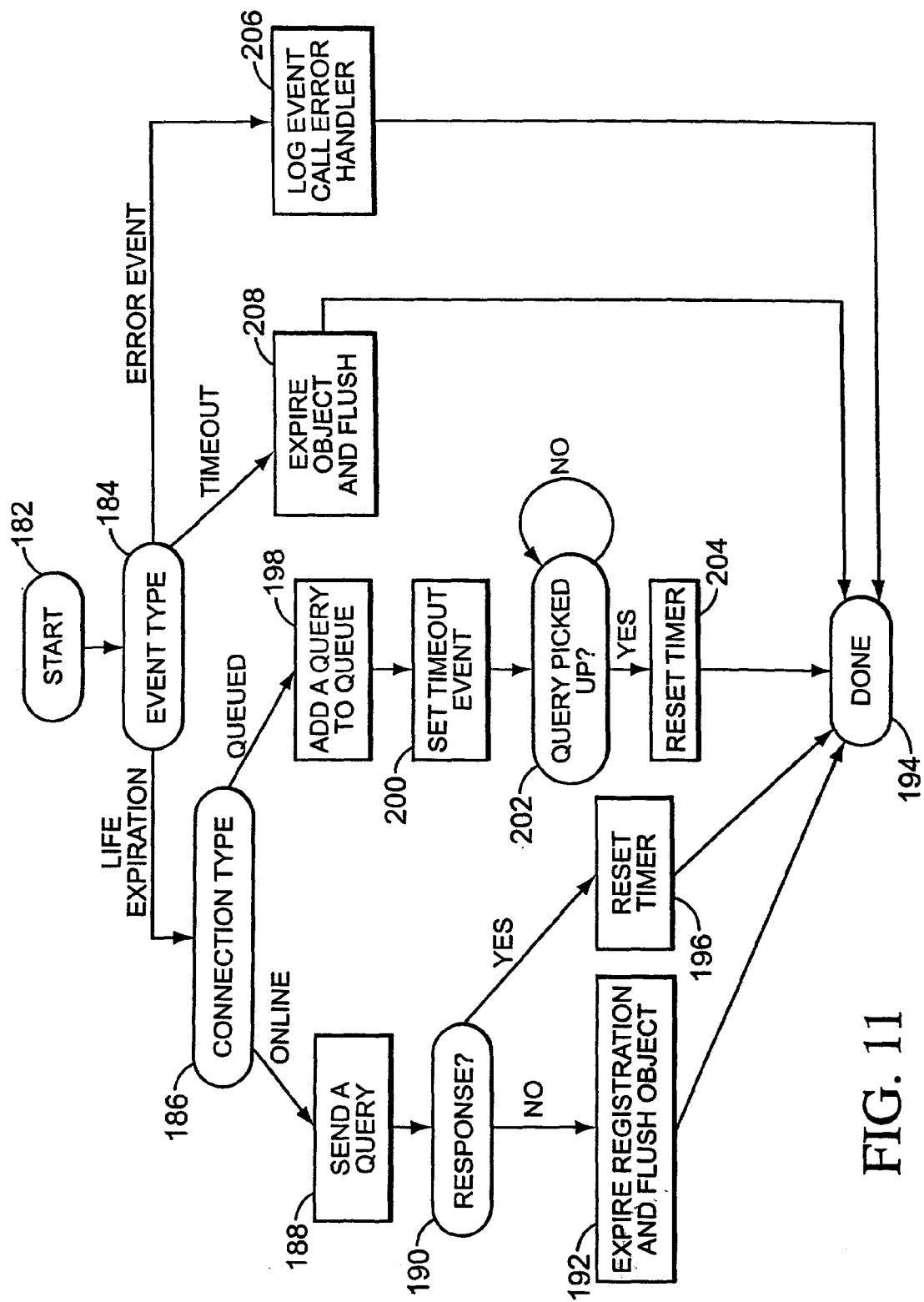
FIG. 11 is a flow diagram of a process to handle raised events of the present invention.

FIG. 11 is a flow diagram of a process to handle raised events of the present invention, and more particularly the handle raise event operation 76 of FIG. 4. The process begins at START 182 and proceeds to event type operation 184. If the event type is a life expiration, the connection type is determined at operation 186. Control is then passed to operation 188 where a query is sent if the connection type is live or online. Operation 190 determines if a response has been received. If no response is received, operation 192 expires the registration and expires the object and the process completes at DONE 194. If a response is received, the timer is reset at operation 196 and control is passes to operation 194. Referring back to operation 186, if the connection type is not online, the query is queued at operation 198. Operation 200 initiates a timeout event. Operation 202 then repeatedly checks to see if the query has been picked up. Once the query is picked up, the timer is reset at operation 204 and the process terminates at operation 194.

Continuing on with the various event types, if an error event is detected at operation 184, the event call error handler is logged at operation 206. Finally, if a timeout event is detected at operation 184, the object is expired ad flushed at operation 208. The process completes at operation 194 after bother operations 206 and 208.

Figure 12:
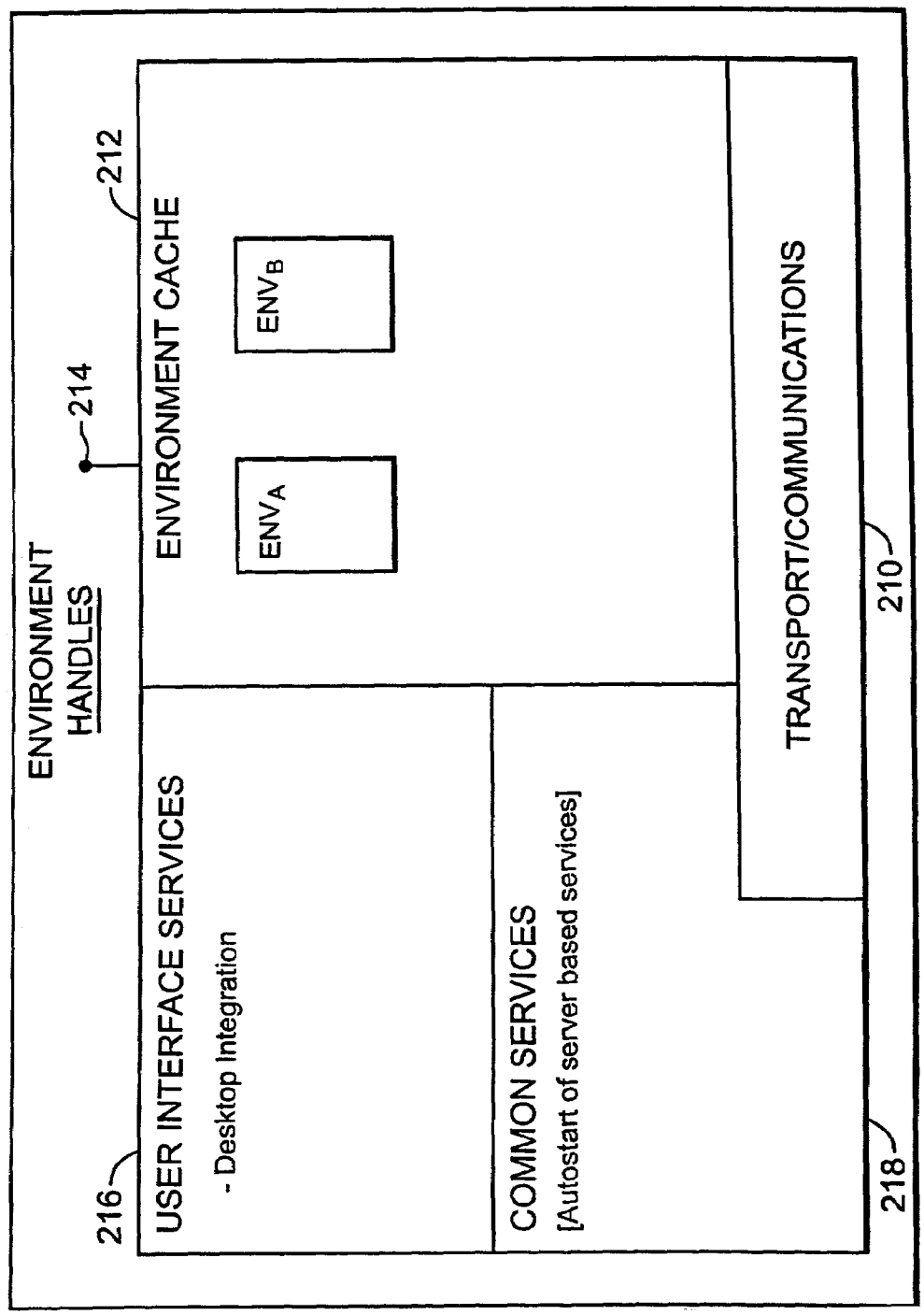
FIG. 12 illustrates the client and server machines architecture in accordance with the present invention.

FIG. 12 illustrates the client and server machines architecture in accordance with the present invention. The transport/communications block 210 handles all communication with the outside world. Some example communication protocols include (but not limited to) Internet and FTP (file transfer protocol). The environment cache 212 maintains a cache of environments. Environments can open, expire and restart here. It provides management of the caches. The environment handles 214 provides a method for the outside world to talk to the environments in the environment cache. The user interface services 216 provides for desktop integration and defines what the user sees at a display. Common services is located at 218. On a server, common services are autostarted. On a client, the common services start only when a user login occurs.

Figure 13:
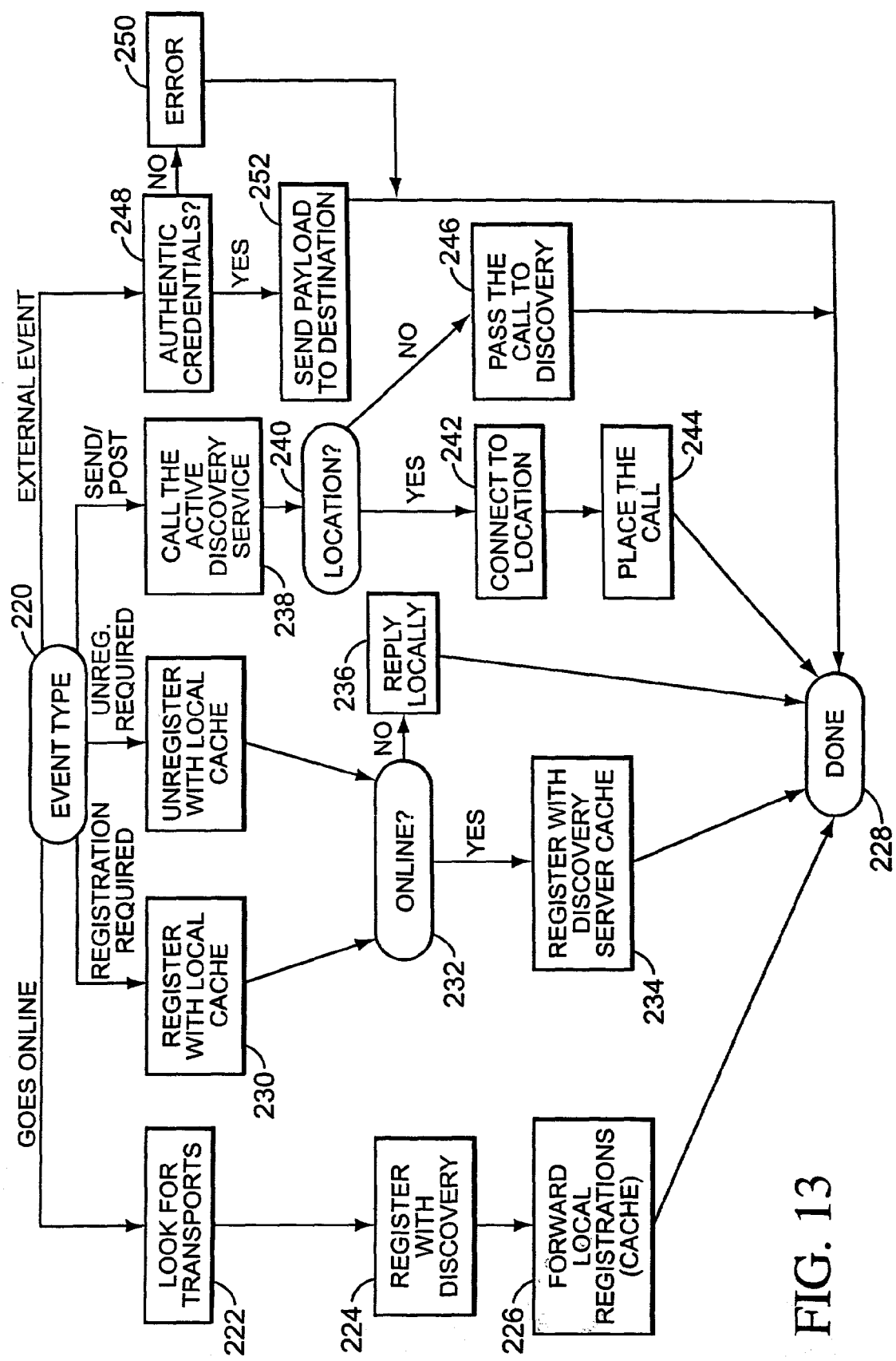
FIG. 13 is a flow diagram of a transport/communications process of the present invention.

FIG. 13 is a flow diagram of a transport/communications process of the present invention, and more specifically the transport/communications block 210 of FIG. 12. The event type is determined at operation 220. If the event is "goes online", operation 222 looks for transports. Registration then takes place with a discovery machine at operation 224 and local registrations (cache) are forwarded at operation 226. The process then terminates at operation 228. The "registration required" event type prompts the client or server machine at operation 230 to register with the local cache. Operation 232 determines if a person is online. If they are, operation 234 registers the client or server machine with the discovery server cache. Control is then passed to DONE 228. If a person is not online at operation 232, a local reply is generated at operation 236 and control again passes to DONE 228.

A "send/post" event type prompts the client/server machine to call an active discovery service at operation 238. If the location of the recipient is found at operation 240, a connection is made to the location at operation 242 and a call is placed at operation 244. Alternatively, if the location of the recipient is not found at operation 240, the information is passed to the discovery machine to be queued for a later delivery at operation 246. The process then ends at operation 228 after operation 244 or 246.

The last event type to be handled is the "external" event type. The "external" event type is the end of a send function and includes authentication credentials and it sends the payload. Credentials are authenticated at operation 248. If the credentials can not be authenticated, an error is generated at operation 250. If they can be authenticated, the payload is sent to its destination via operation 252. The process then ends at operation 228, after operation 250 or 252.

FIG. 13 also illustrates an embodiment of the present invention where there are multiple discovery, client and server machines in various states of on and offline modes exchanging information.

Figure 14:
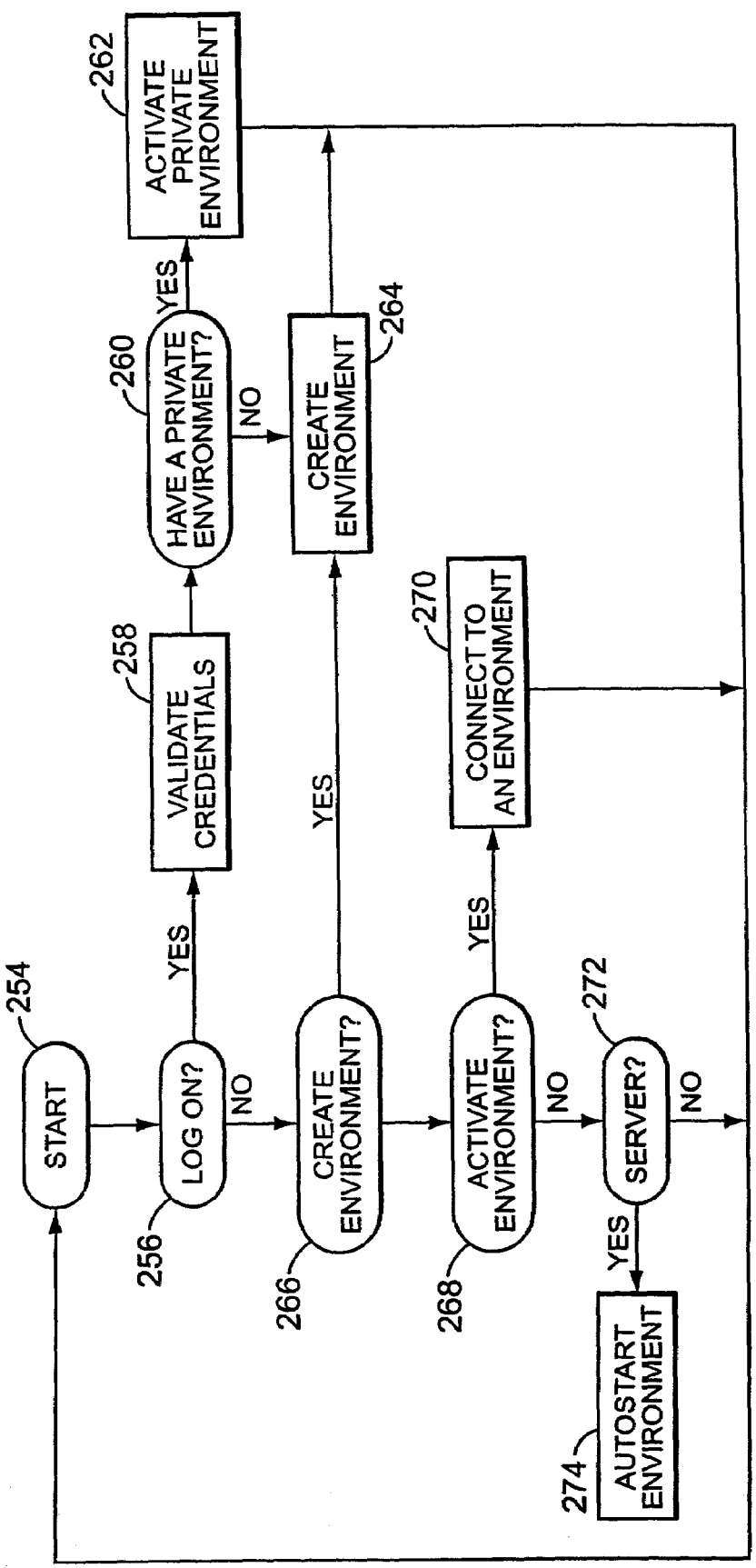
FIG. 14 is a flow diagram of a common services functions of the present invention.

FIG. 14 is a flow diagram of a common services functions of the present invention, and more particularly, the common services block 218 of FIG. 12. Beginning at START 254, control is passed to operation 256 where a user is prompted to logon. If a person logins, their credentials are validated at operation 258. Operation 260 determines if a private environment is required. If yes, operation 262 activates a private environment and control is directed back to START 254. If no private environment is required, a regular environment is created at operation 264 and operation is subsequently passed again to START 254.

Referring back to operation 256, if no logon occurs, it is determined if an environment needs to be created at operation 266. If yes, operation 264 is executed. If no, operation 268 determines if an environment needs to be activated. Operation 270 connects to an environment if an environment needs to be activated. If no environment needs to be activated, operation 272 determines if the machine is a server. If affirmative, operation 274 autostarts an environment. Operational control reverts back to START 254 after operations 264, 270 and 272 (if the machine is not a server).

While this invention has been described in terms certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. An information management method comprising;
    invoking a client environment hosted on a client machine;
    registering the client environment with a discovery machine coupled to the client machine by a network;
    processing an event at the discovery machine using a first event handler, wherein the event is selected from the group consisting of a register event, an unregister event, a send/post event, a request event and a raise event;
    invoking a second event handler upon the occurrence of the raise event;
    registering a server machine coupled to the network with the discovery machine;
    registering a host environment of the client environment on the server machine with the discovery machine upon an indication that the server machine has a communication for the client environment;
determining whether a client machine is on-line; and
establishing a direct link between the client machine and the server machine if the client machine is on-line; and
delivering the communication from the server machine to the client machine via the direct link.

2. An information management method as recited in claim 1 wherein the second event handler processes at least one of a life expiration event, timeout event or an error event.

3. An information management system comprising:
a plurality of client machines, each of which are coupled to a network, that host a plurality of client environments;
a plurality of server machines, each of which are coupled to the network, that host a plurality of host client environments;
a plurality of discovery machines, each of which are coupled to the network, comprising first event handler, wherein the plurality of discovery machines is adapted for:
determining whether a client machine is on-line; and
facilitating a connection between a single client environment and a single host client environment for the transfer of information if the client machine is on-line; and
wherein the first event handler is adapted for:
processing at least one event selected from the group consisting of a register event, an unregister event, a send/post event, a request event and a raise event; and
invoking a second event handler upon occurrence of the raise event.

4. An information management system as recited in claim 3 wherein the second event handler processes at least one of a life expiration event, timeout event or an error event.

5. An information management method comprising;
invoking a client environment hosted on a client machine;
registering the client environment with a discovery machine coupled to the client machine by a network;
processing an event at the discovery machine using a first event handler, wherein the event is selected from the group consisting of a register event, an unregister event, a send/post event, a request event and a raise event;
invoking a second event handler upon the occurrence of the raise event;
registering a server machine coupled to the network with the discovery machine;
registering a host environment of the client environment on the server machine with the discovery machine upon an indication that the server machine has a communication for the client environment;
establishing a direct link between the client machine and the server machine; and
delivering the communication from the server machine to the client machine.

6. An information management method as recited in claim 5 wherein the second event handler processes at least one of a life expiration event, timeout event or an error event.

7. An information management system comprising:
a plurality of client machines, each of which are coupled to a network, that host a plurality of client environments;
a plurality of server machines, each of which are coupled to the network, that host a plurality of host client environments;
a plurality of discovery machines, each of which are coupled to the network, comprising a first event handler, wherein the plurality of discovery machines is adapted for facilitating a connection between a single client environment and a single host client environment for the transfer of information, and wherein the first event handler is adapted for:
processing at least one event selected from the group consisting of a register event, an unregister event, a send/post event, a request event and a raise event; and
invoking a second event handler upon occurrence of the raise event.

8. An information management system as recited in claim 7 wherein the second event handler processes at least one of a life expiration event, timeout event or an error event.

* * * * *